(12) United States Patent
Drory et al.

(10) Patent No.: US 10,795,549 B2
(45) Date of Patent: Oct. 6, 2020

(54) GENERATING A GRAPHICAL USER INTERFACE TO NAVIGATE VIDEO CONTENT

(71) Applicant: INTERNATIONAL BUSINESS MACHINES CORPORATION, Armonk, NY (US)

(72) Inventors: Tal Drory, Haifa (IL); Dror Porat, Haifa (IL); Daniel N. Rotman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 15/918,099

(22) Filed: Mar. 12, 2018

(65) Prior Publication Data
US 2019/0278440 A1    Sep. 12, 2019

(51) Int. Cl.
*G06F 3/0484* (2013.01)
*G06T 11/00* (2006.01)
(Continued)

(52) U.S. Cl.
CPC .......... *G06F 3/0484* (2013.01); *G06F 16/743* (2019.01); *G06F 16/7867* (2019.01); *G06T 11/001* (2013.01); *G06T 2200/24* (2013.01)

(58) Field of Classification Search
CPC . G06T 11/001; G06T 2200/24; G06F 3/0484; G06F 16/743; G06F 16/7867
See application file for complete search history.

(56) References Cited

U.S. PATENT DOCUMENTS

| 7,152,209 B2 | 12/2006 | Jojic et al. |
| 2001/0020981 A1 | 9/2001 | Jun et al. |

(Continued)

FOREIGN PATENT DOCUMENTS

| CN | 103440640 B | 2/2016 |
| WO | 2017108426 A1 | 6/2017 |

OTHER PUBLICATIONS

Graham et al., "A Paper-Based Interface for Video Browsing and Retrieval," Multimedia and Expo, 2003, ICME International Conference 2003 Proceedings, Jul. 6-9, 2003, Copyright 2003 IEEE, pp. 749-752.

(Continued)

*Primary Examiner* — Eric J. Bycer
(74) *Attorney, Agent, or Firm* — Jordan T. Schiller

(57) ABSTRACT

A computer-implemented method for providing a graphical user interface (GUI) for video navigation by a user, including generating a GUI comprising a representation of partitioned segments of video content, the representation depicting a dimension of time, a dimension of scale, and a dimension of relevance for the partitioned segments of video content, wherein the GUI includes a first axis that depicts the dimension of time and a second axis that depicts the dimension of scale. The method further entails determining the dimension of relevance for the partitioned segments of video content based on receiving a text query from a user dynamically, or from a pre-defined source, and comparing one or more attributes of the partitioned segments of video content to the text query, or to the pre-defined source. The method further includes assigning a color to the partitioned segments of video content according to a color scheme for easy navigation.

19 Claims, 6 Drawing Sheets

(51) Int. Cl.
    *G06F 16/74*         (2019.01)
    *G06F 16/78*         (2019.01)

(56) References Cited

U.S. PATENT DOCUMENTS

| | | | | |
|---|---|---|---|---|
| 2002/0180774 | A1* | 12/2002 | Errico | G11B 27/005 |
| | | | | 715/721 |
| 2003/0122874 | A1* | 7/2003 | Dieberger | G06F 16/904 |
| | | | | 715/764 |
| 2005/0198570 | A1* | 9/2005 | Otsuka | G11B 27/28 |
| | | | | 715/201 |
| 2010/0281383 | A1* | 11/2010 | Meaney | G11B 27/34 |
| | | | | 715/723 |
| 2011/0307924 | A1* | 12/2011 | Roberts | H04N 5/44543 |
| | | | | 725/44 |
| 2013/0326406 | A1* | 12/2013 | Reiley | G06F 3/048 |
| | | | | 715/810 |
| 2015/0121408 | A1* | 4/2015 | Jacoby | H04N 21/6582 |
| | | | | 725/18 |

OTHER PUBLICATIONS

Disclosed Anonymously, "A two-dimensional user interface for relevance-based instantaneous preview of retrieved videos," An IP.com Prior Art Database Technical Disclosure, IPCOM000238843D, IP.com Electronic Publication Date: Sep. 22, 2014, pp. 1-2.

Mell et al., "The NIST Definition of Cloud Computing," National Institute of Standards and Technology, U.S. Department of Commerce, Special Publication 800-145, Sep. 2011, pp. 1-7.

\* cited by examiner

GENERATING A GRAPHICAL USER INTERFACE TO NAVIGATE VIDEO CONTENT

BACKGROUND

Embodiments of the present invention relate generally to the field of computing and more particularly to data processing and video content browsing by means of a graphical user interface.

In the current age of digital video content, it is very often time consuming for a user to find a specific scene or reference within a video, without having to watch a majority of the video or expend time manually searching the video content. Even after searching, a user may not know if relevant scenes or references within the video content were missed. Likewise, some video content may be inappropriate for viewing at particular locations, such as the workplace. It may be helpful for a user to know beforehand the content of specific video scenes before playing them.

SUMMARY

Embodiments of the invention include a method, computer program product, and system, for providing a graphical user interface (GUI) for video navigation by a user.

A method, according to an embodiment, for providing a GUI for video navigation by a user, wherein the method includes generating a GUI that contains a representation of partitioned segments of video content, the representation depicting a dimension of time, a dimension of scale, and a dimension of relevance for the partitioned segments of video content. The method further includes determining the dimension of relevance for the partitioned segments of video content based on a text query.

A computer program product, according to an embodiment of the invention, includes a non-transitory tangible storage device having program code embodied therewith. The program code is executable by a processor of a computer to perform a method. The method includes generating a GUI that contains a representation of partitioned segments of video content, the representation depicting a dimension of time, a dimension of scale, and a dimension of relevance for the partitioned segments of video content. The method further includes determining the dimension of relevance for the partitioned segments of video content based on a text query.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method includes generating a GUI that contains a representation of partitioned segments of video content, the representation depicting a dimension of time, a dimension of scale, and a dimension of relevance for the partitioned segments of video content. The method further includes determining the dimension of relevance for the partitioned segments of video content based on a text query.

DETAILED DESCRIPTION

Currently, there exist specialized video players that enable a user to interact with video content in various ways. For example, there is quick video navigation that enables a user to browse video content by chapters, scenes, or episodes.

However, there is no separate graphical user interface (GUI), with relation to video content, that allows a user to use the results of a multi-scale video scene detection method for efficient video browsing and searching. The present invention seeks to allow a user to naturally and effectively navigate video content by means of a GUI and the relevancy of the video content based on a user text query or a pre-defined source.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Figure 1:
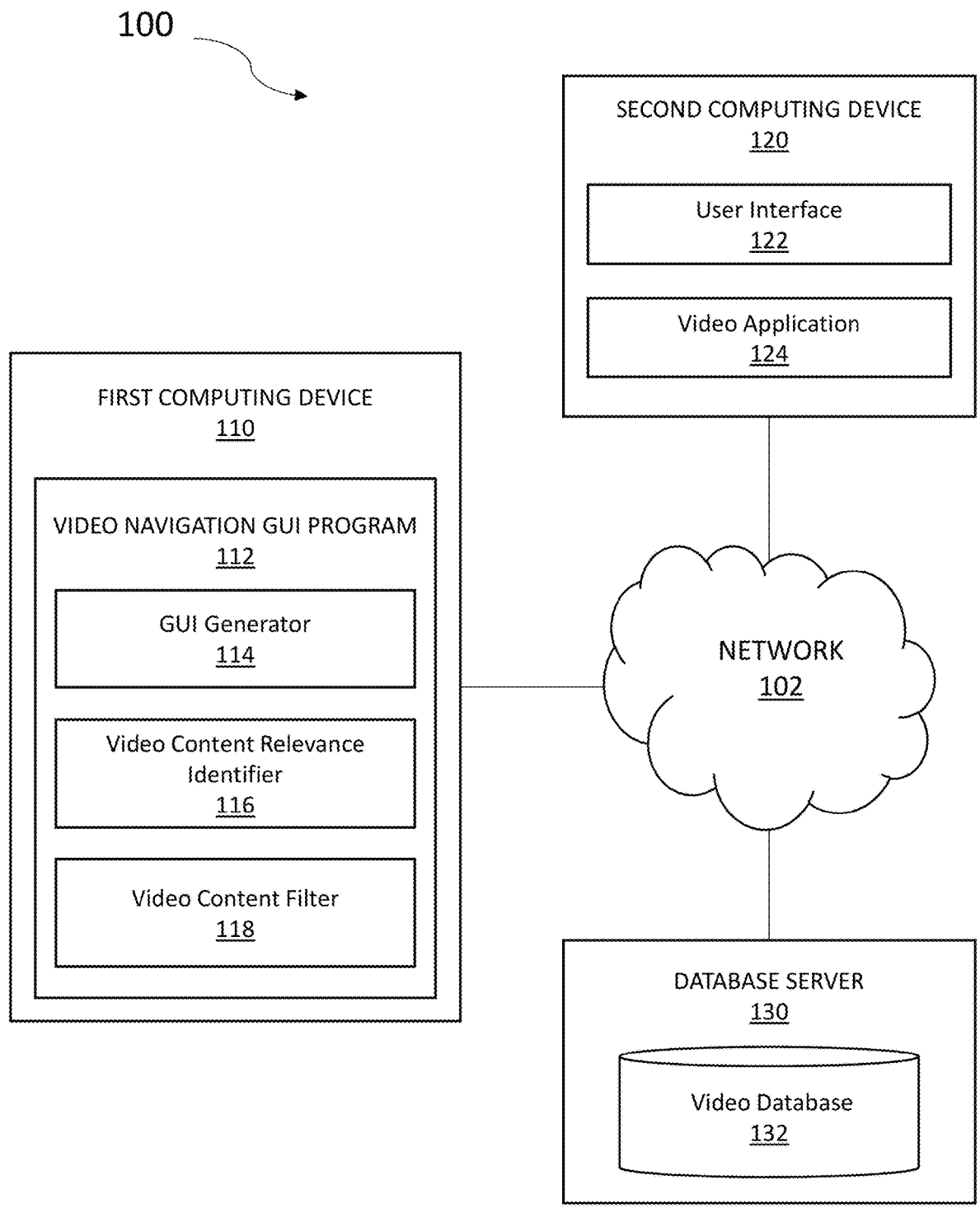
FIG. 1 illustrates a video navigation GUI computing environment 100, in accordance with an embodiment of the present invention.

FIG. 1 illustrates a video navigation GUI computing environment 100, in accordance with an embodiment of the present invention. Video navigation GUI computing environment 100 includes first computing device 110, second computing device 120, and database server 130 all connected via network 102. The setup in FIG. 1 represents an example embodiment configuration for the present invention, and is not limited to the depicted setup in order to derive benefit from the present invention.

In the example embodiment, first computing device 110 includes video navigation GUI program 112. In various embodiments, first computing device 110 may be a server, laptop computer, tablet computer, netbook computer, personal computer (PC), a desktop computer, a personal digital assistant (PDA), a smart phone, or any programmable electronic device capable of communicating with second computing device 120 and database server 130 via network 102. First computing device 110 may include internal and external hardware components, as depicted and described in further detail below with reference to FIG. 5. In other embodiments, first computing device 110 may be implemented in a cloud computing environment, as described in relation to FIGS. 6 and 7, herein. First computing device 110 may also have wireless connectivity capabilities allowing it to communicate with second computing device 120 and database server 130, as well as other computers or servers over network 102.

In an exemplary embodiment, video navigation GUI program 112 contains instruction sets, executable by a processor, which may be described using a set of functional modules. The functional modules of video navigation GUI program 112 include GUI generator 114, video content relevance identifier 116, and video content filter 118.

With continued reference to FIG. 1, second computing device 120 includes user interface 122, and video application 124. In various embodiments, second computing device 120 may be a server, laptop computer, tablet computer, netbook computer, personal computer (PC), a desktop computer, a personal digital assistant (PDA), a smart phone, or any programmable electronic device capable of communicating with first computing device 110 and database server 130 via network 102. Second computing device 120 may include internal and external hardware components, as depicted and described in further detail below with reference to FIG. 5. In other embodiments, second computing device 120 may be implemented in a cloud computing environment, as described in relation to FIGS. 6 and 7, herein. Second computing device 120 may also have wireless connectivity capabilities allowing it to communicate with first computing device 110 and database server 130, as well as other computers or servers over network 102.

In an exemplary embodiment, user interface 122 may be a computer program that allows a user to interact with second computing device 120 and other connected devices via network 102. For example, user interface 122 may be a graphical user interface (GUI). In addition to comprising a computer program, user interface 122 may be connectively coupled to hardware components, such as those depicted in FIG. 5, for receiving user input. In an example embodiment, user interface 122 may be a web browser, however in other embodiments user interface 122 may be a different program capable of receiving user interaction and communicating with other devices.

In an exemplary embodiment, video application 124 may be a computer program, on second computing device 120, that is capable of receiving videos, movies, or any other multimedia files from a third party video database, such as database server 130. In one embodiment, video application 124 may be a website that contains access to a video repository, such as well-known web sites that act as a platform for posting videos. In other embodiments, video application 124 may be a media player program that is capable of playing stored, saved, uploaded, or downloaded video content on second computing device 120. In exemplary embodiments, various video content played by video application 124 may contain tagged video content, containing classifiers such as keywords, themes, names of people, places, and things which identify characteristics of a particular scene within the video content. Video tagging is well known to one of ordinary skill in the art. For example, tagged video content in a soccer match video may include classifiers such as "goals", "passing", "yellow card", "red card", "team celebration", and so forth.

In exemplary embodiments, the video content may initially be reviewed and tagged with keywords by a subject matter expert, or by a computer system capable of tagging a scene with classifiers. Tagging a scene with classifiers may include, but is not limited to, facial recognition technology, optical character recognition (OCR), location detection technology, light detection technology, and any other technology capable of identifying objects, people, weather, or any other objects located within a scene of video content. The tagging of a scene, either by a subject matter expert or by any of the technologies referenced above, is not a component of the present invention but plays a role in identifying a dimension of relevance within partitioned segments of video content, as will be discussed further herein.

With continued reference to FIG. 1, database server 130 includes video database 132 and may be a laptop computer, tablet computer, netbook computer, personal computer (PC), a desktop computer, a personal digital assistant (PDA), a smart phone, a server, or any programmable electronic device capable of communicating with first computing device 110 and second computing device 120 via network 102. While database server 130 is shown as a single device, in other embodiments, database server 130 may be comprised of a cluster or plurality of computing devices, working together or working separately.

In an exemplary embodiment, video database 132 may represent a database management system that is capable of storing, in memory, various types of video content having different container formats known to one of ordinary skill in the art.

In further embodiments, video database 132 may store video content files organized by category, type of container format, or in any fashion deemed most useful for the invention to be utilized.

In various embodiments, video database 132 may be stored on first computing device 110, or second computing device 120, as a separate database.

Figure 2:
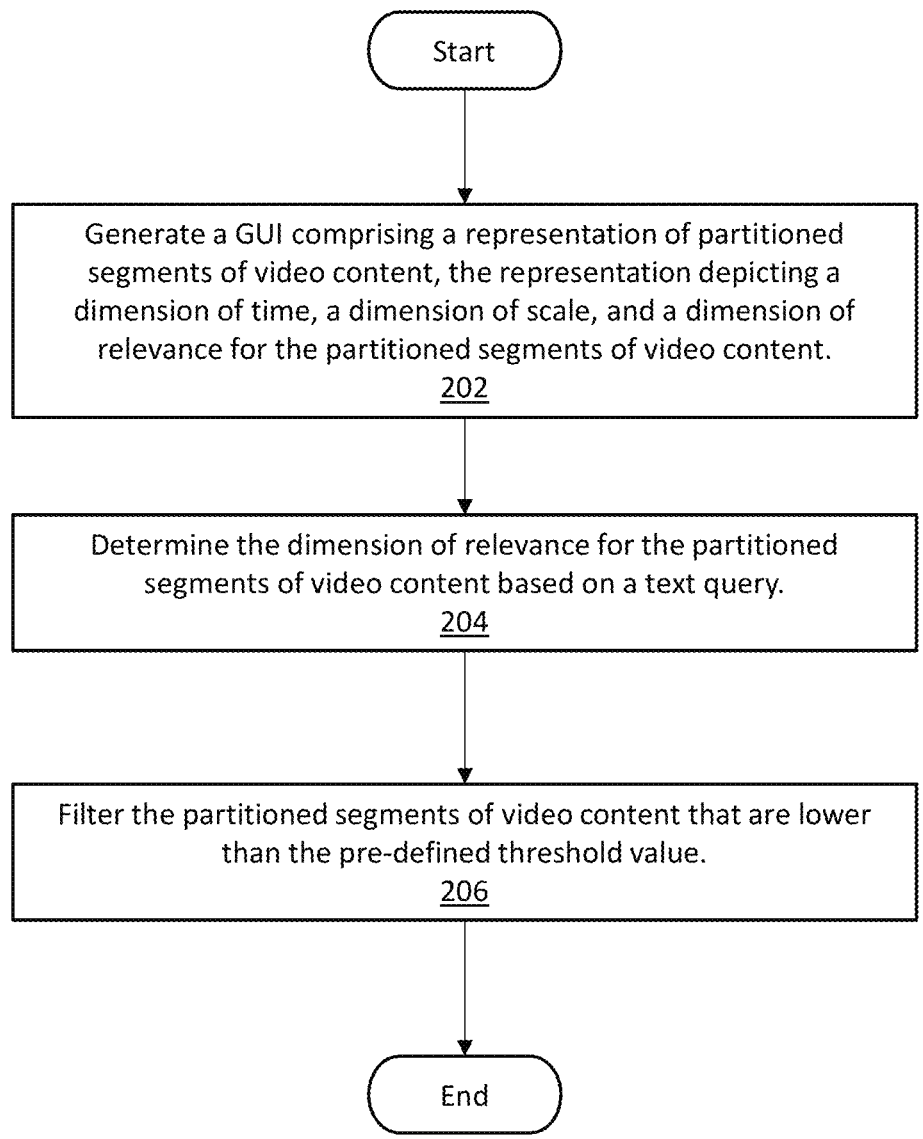
FIG. 2 is a flowchart illustrating the operation of video navigation GUI program 112, in accordance with an embodiment of the present invention.

FIG. 2 is a flowchart illustrating the operation of video navigation GUI program 112, in accordance with an embodiment of the present invention.

Referring now to FIGS. 1 and 2, video navigation GUI program 112 generates a GUI for video navigation by a user, comprising a segmented representation of video content based on relevance to a user search query or a pre-defined source.

With continued reference to FIGS. 1 and 2, GUI generator 114 includes a set of programming instructions in video navigation GUI program 112. The set of programming instructions is executable by a processor. GUI generator 114 generates a GUI comprising a representation of partitioned segments of video content, the representation depicting a dimension of time, a dimension of scale, and a dimension of relevance for the partitioned segments of video content (step 202).

In an exemplary embodiment, partitioned segments of video content refer to one or more scenes, or chapters, within the video content. For example, a scene may include either the place where an incident occurs, or a sequence of continuous action in the video content. In alternative embodiments, a scene may include a segment of time, for example, a character's childhood, teenage years, and adult life. In other embodiments, various scenes may depict a location such as an indoor or outdoor setting, or an encounter between particular actors. In other embodiments, a scene within the video content may be defined by the user in any fashion deemed most useful for the invention to be utilized.

In exemplary embodiments, a dimension of time refers to sequential elapsed time of video content. For example, a dimension of time within the video content may begin at zero seconds and may end at one hour and thirty minutes. In other embodiments, a dimension of time may include a video segment commencing at forty-five seconds and terminating at fifty-five seconds.

In exemplary embodiments, a dimension of scale refers to a level of granularity of the partitioned segments of video content. A broad dimension of scale, in exemplary embodiments, may refer to multiple scenes contained within one partitioned segment of video. For example, a broad dimension of scale may contain video content that is partitioned into two segments that include the closing credits (first segment) and the remainder of the video content (second segment). A narrow dimension of scale, in exemplary embodiments, may refer to various scenes within the video content, each being partitioned into its own respective video segment. For example, a narrow dimension of scale may contain video content that is partitioned into an opening scene (first segment), a change in location scene (second segment), an airplane scene (third segment), another change in location scene (fourth segment), introduction of a new actor scene (fifth segment), and so forth. As the scale of the video content, depicted on the GUI, becomes more narrow, or granular, more segments of the video content may be displayed.

In exemplary embodiments, a dimension of relevance refers to a scene, chapter, or segmented portion of the video content that contains one or more attributes that match either a user text query, or a pre-defined source. Determining, classifying, and depicting a dimension of relevance, on the GUI, is discussed further herein with relation to video content relevance identifier 116.

Figure 3:
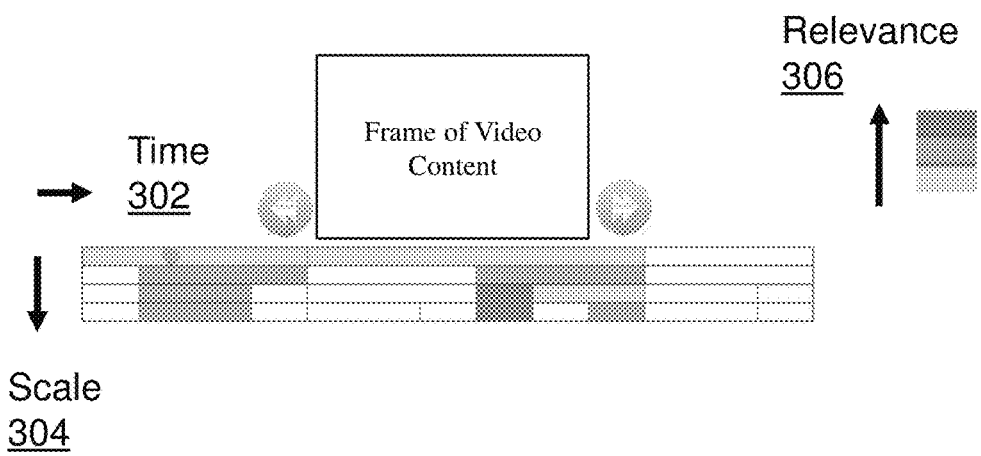
FIG. 3 depicts an example of a video navigation GUI, in accordance with an embodiment of the present invention.

FIG. 3 depicts an example of a video navigation GUI, in accordance with an embodiment of the present invention.

With reference to FIGS. 1-3, GUI generator 114 generates a GUI which is a two-dimensional visual element that contains a first axis that depicts the dimension of time 302, and a second axis that depicts the dimension of scale 304. In an exemplary embodiment, the first axis is a horizontal axis and the second axis is a vertical axis, as depicted in FIG. 3. In other embodiments, the first axis may be the vertical axis and the second axis may be the horizontal axis.

With continued reference to FIG. 3, the number of partitioned segments of video content increase as the dimensions of time 302 and scale 304 increase. In an exemplary embodiment depicted in FIG. 3, four rows are depicted on the generated GUI. In descending order, the top row contains three partitioned segments of the video content, the second row contains five partitioned segments of the video content, the third row contains eight partitioned segments of the video content, and the fourth row contains ten partitioned segments of the video content, all corresponding to the increase in the dimension of time 302 and scale 304 on the generated GUI. In the exemplary embodiment, the dimension of relevance 306 is depicted by a grayscale color shading scheme wherein the darker the shade of grey for a given partitioned segment of video content, the more relevant that segmented portion of the video content is. In a preferred embodiment, the dimension of relevance 306 may be depicted by a color shading scheme, for example the darker the color red, the more relevant the partitioned segment of video content. In alternative embodiments, the dimension of relevance 306 may be depicted by a number scheme, a picture scheme, or any other scheme that depicts a variation in the dimension of relevance 306 for a user text query or a pre-defined source within the video content.

With reference to an illustrative example, GUI generator 114 may generate a GUI for a recorded football game, depicting the dimensions of time 302, the dimension of scale 304, and the dimension of relevance 308 for the one or more partitioned segments of the recorded football game. In this example, the dimension of time 302 may be displayed on the horizontal axis (the first axis) of the generated GUI, wherein the elapsed time moves from left to right across the horizontal axis. The dimension of scale 304 may be displayed on the vertical axis (the second axis), wherein the number of partitioned segments of the recorded football game increase from top to bottom down the vertical axis.

Figure 4:
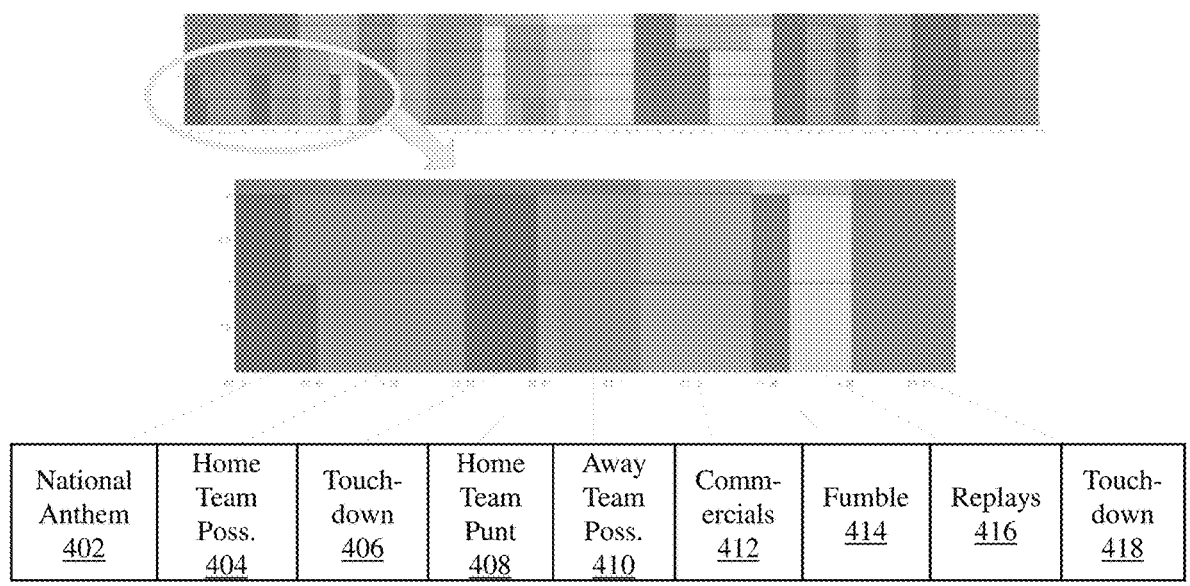
FIG. 4 depicts a timeline of the video navigation GUI of FIG. 3, wherein the GUI further represents a more granular look at what is taking place in a particular Quarter of play in a football game, in accordance with an embodiment of the present invention.

FIG. 4 depicts a timeline of the video navigation GUI of FIG. 3, wherein the GUI further represents a more granular look at what is taking place in a particular quarter of play in a football game, in accordance with an embodiment of the present invention.

With reference to FIG. 4 and the continued illustrative example above, GUI generator 114 may display three partitioned segments on the top row of the generated GUI, corresponding to three broad partitioned segments of the recorded football game. These three broad partitioned segments may, for example, correspond to the pre-game warmups (first segment), the four quarters of football play (second segment), and the post-game interviews (third segment). As the time and scale increases on the generated GUI, the partitioned video segments of the recorded football game may become more numerous and narrow, corresponding to more scenes such as first quarter play, second quarter play, third quarter play, fourth quarter play, and so forth. As time and scale increase on the generated GUI, GUI generator 114 may further increase the granularity of the partitioned video segments. For example, the quarters of play may be further segmented according to national anthem 402, home team possession 404, touchdown 406, home team punt 408, away team possession 410, commercials 412, fumble 414, replays 416, and touchdown 418.

With continued reference to FIG. 4, a darker shade of gray may represent a particular, or relevant, aspect of the football game to the user. For example, touchdown 406 and fumble 414 are depicted as a darker shade of gray than, for example, a shade of gray associated with commercials 412 and replays 416. In exemplary embodiments, the various shades of gray may be based on results of a user text query. In alternative embodiments, video navigation GUI program 112 may be capable of determining what is more relevant to a user based on past user video viewing experiences and video tagging.

In alternative embodiments, the color scheme may be based on shades of red (or any other color), wherein the darker the shade of red, the more relevant the partitioned segment of video is to the user. In alternative embodiments, any other visual depiction (i.e. number, picture, etc.) of increased or decreased relevance of partitioned segments of video content, known to one of ordinary skill in the art, may be used.

Referring back to FIGS. 1 and 2, video content relevance identifier 116 includes a set of programming instructions in video navigation GUI program 112. The set of programming instructions is executable by a processor. Video content relevance identifier 116 determines the dimension of relevance for the partitioned segments of video content based on a text query (step 204).

In exemplary embodiments, a text query may include entered keyword or phrase searches used to find specific data within tagged video content. For example, video content relevance identifier 116 may receive the text query from a user dynamically, or from a pre-defined source, and compare one or more attributes of the partitioned segments of video content to the text query, or to the pre-defined source. One or more attributes of the partitioned segments of video content may include classifiers containing tagged keywords or phrases corresponding to a particular scene, or implicit property of interest, within the video content. In exemplary embodiments, a pre-defined source, or implicit property of interest, may include video content that is not safe for work (NSFW), parental guidance required, confidential information, or any other implicit property of interest that may be useful in classifying one or more partitioned segments of the video content.

For example, classifiers within the video content may denote that explicit language is used in a particular segment of video content, that there is adult content in a particular segment of video content, that there is controversial political commentary in a particular segment of video content, and so forth. In exemplary embodiments, video content relevance identifier 116 may be capable of obtaining an average score over a particular scene in a partitioned segment of video content, based on the classifiers containing tagged keywords or phrases corresponding to the particular scene or implicit property of interest within the video content. For example, a five-minute segment of video content may contain thirty seconds of adult content that is NSFW. Video content relevance identifier 116 may rate the thirty seconds of adult content with a score of 5 (on a scale of 1-5, where 5 is the most relevant), however the rest of the five-minute segment of video content may contain material that is safe to view at work.

In exemplary embodiments, the generated score may be translated into a color scheme in order to be visually depicted on the generated GUI. As such, the thirty seconds of adult content may be depicted on the generated GUI with a color scheme, or any other visual scheme, that denotes its NSFW nature.

With reference to FIGS. 1-4, video content relevance identifier 116 depicts a dimension of relevance 306 based on assigning a shade of gray to the partitioned segments of video content according to a grayscale coded scheme. With reference to FIGS. 3 and 4, the grayscale coded scheme is based on shades of gray, wherein the darker the shade of gray, the more relevant the partitioned segment of video content is to the user. On the same note, the lighter the shade of gray, the more irrelevant the partitioned segment of video content is to the user. In exemplary embodiments, relevance to the user may be determined by video tags matching a user text query.

In exemplary embodiments, assigning a darker shade of the color denotes a greater dimension of relevance, and assigning a lighter shade of the color denotes a lower dimension of relevance, wherein a dimension of relevance is either lower than, equal to, or greater than a pre-defined threshold value. In alternative embodiments, assigning a darker shade of the color may denote a lower dimension of relevance, and assigning a lighter shade of the color may denote a greater dimension of relevance.

With continued reference to FIGS. 1 and 2, video content filter 118 includes a set of programming instructions in video navigation GUI program 112. The set of programming instructions is executable by a processor. Video content filter 118 filters the partitioned segments of video content that are lower than a pre-defined threshold value (step 206).

In exemplary embodiments, the pre-defined threshold value may be based on the average score of the scene of the video content. The average score of the scene of the video content may take into consideration the tagged values from prior viewers, or subject matter experts. For example, if the scene contains an average score of 5 (on a scale of 1-5, where 5 is the most relevant), then the scene may be assigned a darker shade of the color, on the generated GUI, denoting a greater dimension of relevance. Likewise, if the scene contains an average score of 2-4, then the scene may be assigned a corresponding lighter shade of the color, on the generated GUI, depicting a lower dimension of relevance.

Further, if the scene contains an average score of 0-1, then the scene may be assigned the color white, on the generated GUI, thereby depicting no relevance to the user text query or pre-defined source.

In alternative embodiments, filtering partitioned segments of video content may further include graying out the partitioned segments of video content, on the generated GUI, that are lower than the pre-defined threshold value and allowing the user to view the partitioned segments of video content, on the generated GUI, that are equal to or greater than the pre-defined threshold value.

In exemplary embodiments, the shade of color for a particular video segment may depend on both the length of time of the video segment and the content of the particular segment, either based on a text query by the user, or a pre-defined source as described above. For example, a broad segment of video content totaling seventy-five minutes and only containing thirty seconds of NSFW material may be depicted in a lighter shade of color (lower dimension of relevance) than a narrower, more granularized, one-minute video segment containing the thirty seconds of NSFW material (greater dimension of relevance).

In further embodiments, the shade of color for a particular video segment corresponds to an explicit user query (e.g. a search term). For example, with continued reference to the recorded football game example above, if a user enters the search term "fumble", the generated GUI may contain a darker shade of color corresponding to the time segments within the video content containing the classifier "fumble", thereby depicting a greater dimension of relevance compared to the other partitioned segments of video content. In exemplary embodiments, a user may play the partitioned segments of video content, in response to the user selecting the partitioned segments on the GUI. In this fashion, a user may easily and efficiently navigate the video content, via the displayed GUI, to view desired content.

With reference to FIGS. 1-4 and the illustrative recorded football game example above, the granularity of each partitioned segment of the recorded football game may be assigned a color pursuant to a color scheme based on an implicit property of interest or an explicit text query by the user. For example, video content relevance identifier 116 may be capable of identifying segments of the recorded football game based on an explicit user text query such as: "touchdown", "fumble", or "home team possession", and assign a color pursuant to a color scheme, in this case a darker shade of gray depicting a greater dimension of relevance 306. In each scenario, video content filter 118 may gray out the partitioned segments of video content, on the displayed GUI, that are lower than the pre-defined threshold value (i.e. segments that do not contain user text query "touchdown", "fumble", or "home team possession"), and allow the user to view the partitioned segments of video content, on the displayed GUI, that are equal to or greater than the pre-defined threshold value (i.e. segments containing user text query "touchdown", "fumble", or "home team possession").

In alternative embodiments, a pre-configuration, or pre-defined source, of video navigation GUI program 112 may include identification of commercials 412 contained within the partitioned segments of the recorded football game. Once identified by video navigation GUI program 112, the segments of video content containing commercials 412 may be assigned a color pursuant to a color scheme, in this case a lighter shade color depicting a lower dimension of relevance 306. Similar to depiction of shaded video segments on a displayed GUI pursuant to a user text query, video content filter 118 may gray out the video content containing commercials 412, on the displayed GUI, resulting in more efficient video navigation by the user.

Figure 5:
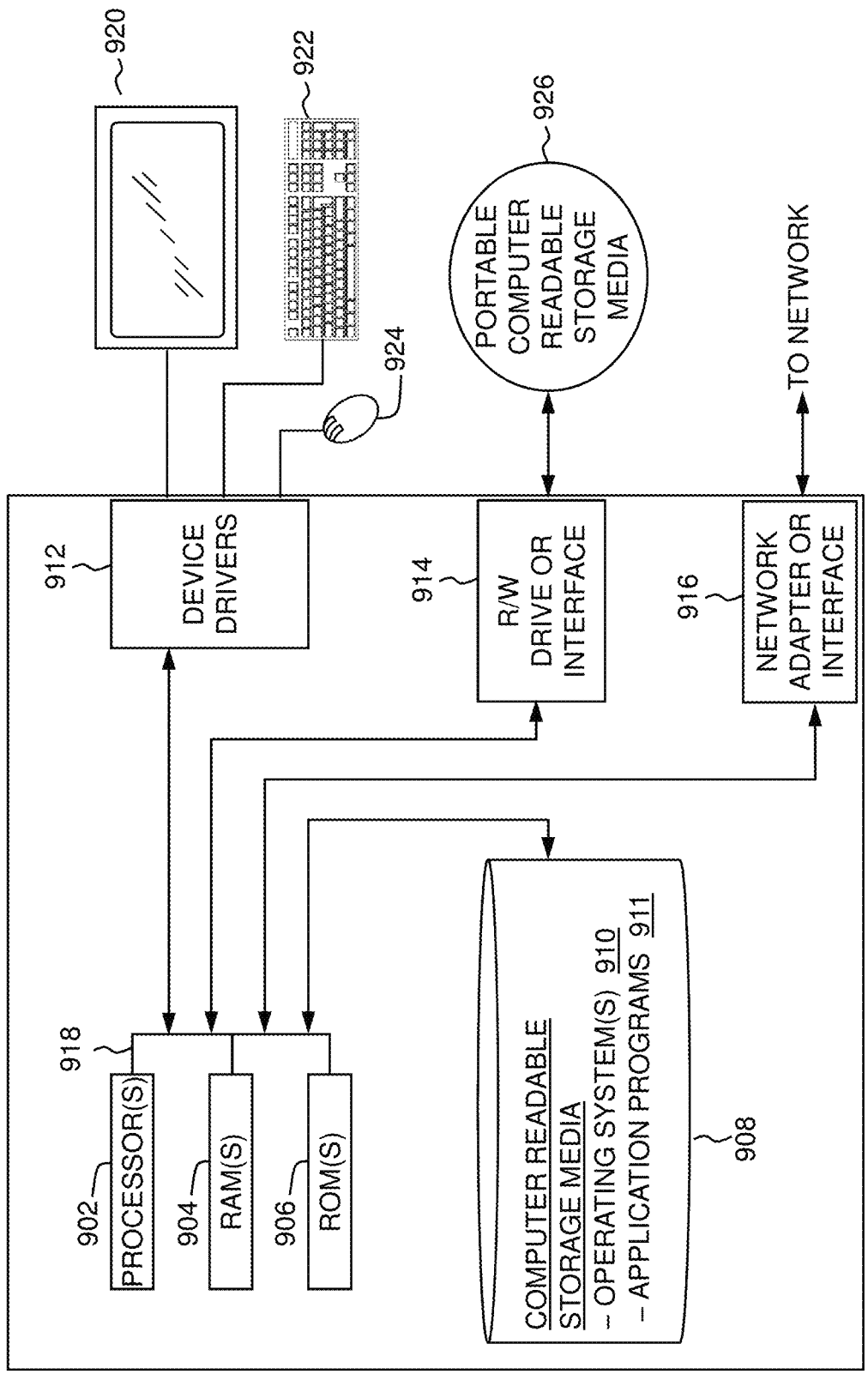
FIG. 5 is a diagram graphically illustrating the hardware components of video navigation GUI computing environment 100 of FIG. 1, in accordance with an embodiment of the present invention.

FIG. 5 is a block diagram depicting components of a computing device in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device of FIG. 5 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as video navigation GUI program 112, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device of FIG. 5 may also include a R/W drive or interface 914 to read from and write to one or more portable computer readable storage media 926. Application programs 911 on computing device may be stored on one or more of the portable computer readable storage media 926, read via the respective R/W drive or interface 914 and loaded into the respective computer readable storage media 908.

Computing device of FIG. 5 may also include a network adapter or interface 916, such as a TCP/IP adapter card or wireless communication adapter (such as a 4G wireless communication adapter using OFDMA technology). Application programs 911 on computing device of FIG. 5 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device of FIG. 5 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
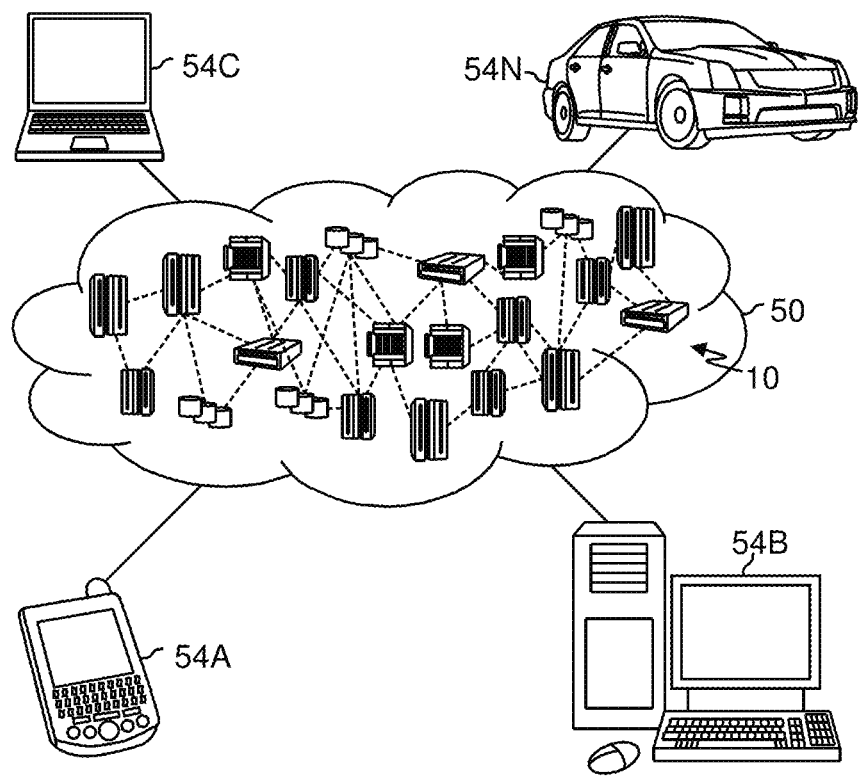
FIG. 6 depicts a cloud computing environment, in accordance with an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
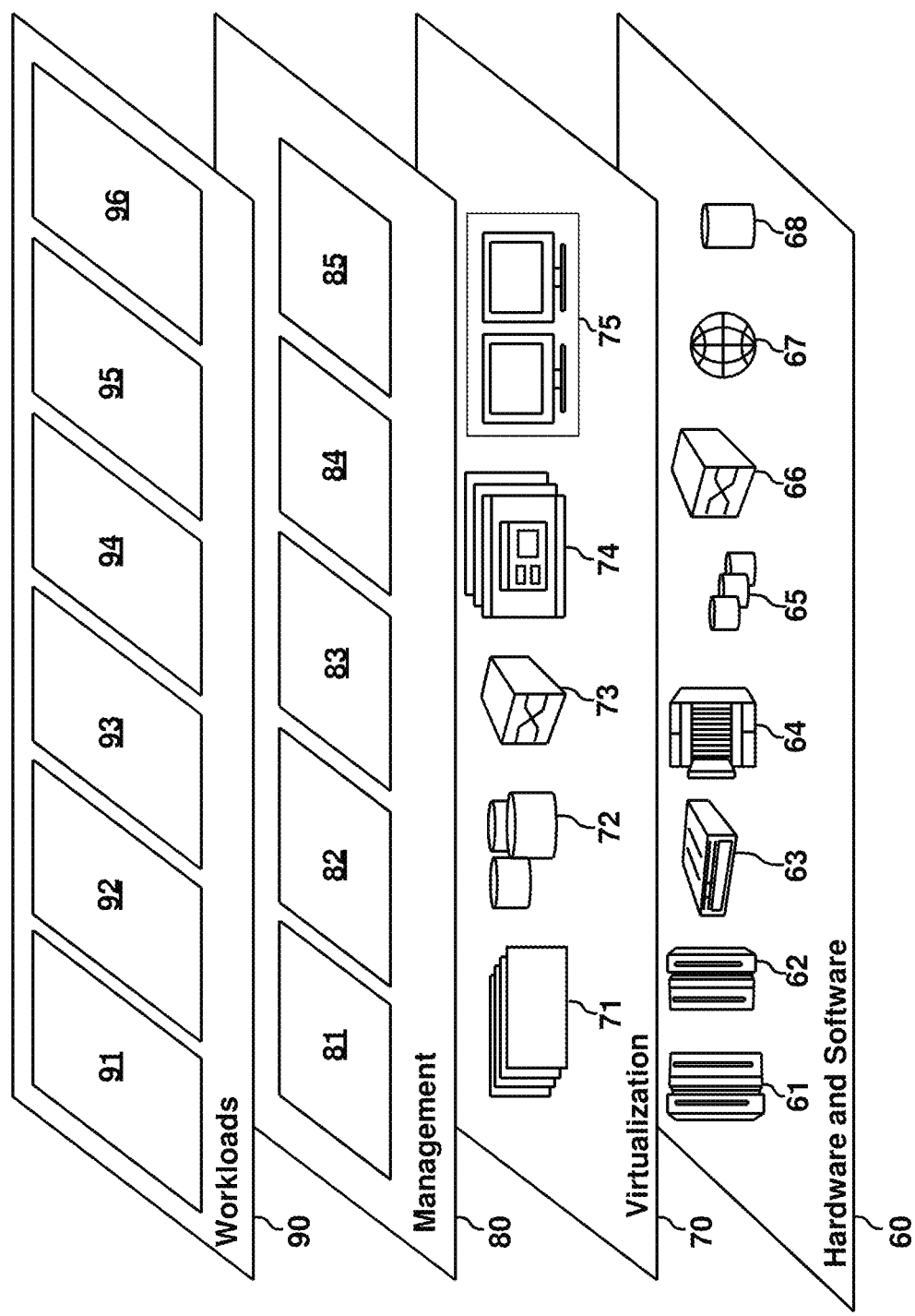
FIG. 7 depicts abstraction model layers of the illustrative cloud computing environment of FIG. 6, in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; analytics services 96, including those described in connection with FIGS. 1-7.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for providing a graphical user interface (GUI) for video navigation by a user, comprising:
    generating a GUI comprising a representation of partitioned segments of video content, the representation depicting a dimension of time, a dimension of scale, and a dimension of relevance for the partitioned segments of video content,
        wherein the dimension of scale refers to a level of granularity of the partitioned segments of video content;
    determining the dimension of relevance for the partitioned segments of video content based on past user video content viewing and video content tagging; and
    increasing or decreasing the dimension of scale on the generated GUI, based on the determined dimension of relevance for the partitioned segments of video content, together with semantic zooming of the partitioned segments of video content, within a navigation bar of the generated GUI, based on a text query of the user.

2. The computer-implemented method of claim 1, wherein the GUI further comprises:
    a first axis that depicts the dimension of time; and
    a second axis that depicts the dimension of scale.

3. The computer-implemented method of claim 2, wherein the first axis is a horizontal axis and the second axis is a vertical axis, or wherein the first axis is the vertical axis and the second axis is the horizontal axis.

4. The computer-implemented method of claim 1, further comprising:
    determining the dimension of relevance for the partitioned segments of video content based solely on the text query.

5. The computer-implemented method of claim 4, wherein determining the dimension of relevance further comprises:
receiving the text query from a user dynamically, or from a pre-defined source; and
comparing one or more attributes of the partitioned segments of video content to the text query, or to the pre-defined source; and
filtering the partitioned segments of video content that are lower than a pre-defined threshold value.

6. The computer-implemented method of claim 5, wherein filtering the partitioned segments of video content further comprises:
graying out the partitioned segments of video content, on the GUI, that are lower than the pre-defined threshold value; and
allowing the user to view the partitioned segments of video content, on the GUI, that are equal to or greater than the pre-defined threshold value.

7. The computer-implemented method of claim 1, wherein the dimension of relevance is depicted by:
assigning a color to the partitioned segments of video content according to a color scheme.

8. The computer-implemented method of claim 7, wherein assigning the color to the partitioned segments of video content according to the color scheme further comprises:
assigning a darker shade of the color to denote a greater dimension of relevance; and
assigning a lighter shade of the color to denote a lower dimension of relevance,
wherein a dimension of relevance is either lower than, equal to, or greater than a pre-defined threshold value.

9. The computer-implemented method of claim 1, further comprising:
playing the partitioned segments of video content, in response to the user selecting the partitioned segments on the GUI.

10. The computer-implemented method of claim 1, further comprising:
displaying the GUI.

11. The computer-implemented method of claim 1, further comprising:
displaying the GUI, wherein the GUI further comprises a first axis that depicts the dimension of time and a second axis that depicts the dimension of scale;
determining the dimension of relevance for the partitioned segments of video content based solely on the text query, wherein determining further comprises:
receiving the text query from a user dynamically, or from a pre-defined source; and
comparing one or more attributes of the partitioned segments of video content to the text query, or to the pre-defined source;
assigning a color to the partitioned segments of video content according to a color scheme, wherein
assigning a darker shade of the color denotes a greater dimension of relevance; and
assigning a lighter shade of the color denotes a lower dimension of relevance, wherein a dimension of relevance is either lower than, equal to, or greater than a pre-defined threshold value;
filtering the partitioned segments of video content that are lower than the pre-defined threshold value, wherein filtering further comprises:
graying out the partitioned segments of video content, on the GUI, that are lower than the pre-defined threshold value; and
allowing the user to view the partitioned segments of video content, on the GUI, that are equal to or greater than the pre-defined threshold value; and
playing the partitioned segments of video content, in response to the user selecting the partitioned segments on the GUI.

12. The computer-implemented method of claim 1, further comprising:
identifying one or more scenes of the partitioned segments of video content that contain an implicit property of interest, based on a plurality of classifiers containing one or more tagged keywords corresponding to the one or more scenes of the partitioned segments of video content;
obtaining an average score for the one or more scenes of the partitioned segments of video content, wherein the average score is determined based on rating the one or more scenes via the plurality of classifiers corresponding to the one or more scenes of the partitioned segments of video content; and
filtering the one or more scenes of the partitioned segments of video content that are rated below a pre-defined threshold value, based on the obtained average score for the one or more scenes.

13. A computer program product, comprising a non-transitory tangible storage device having program code embodied therewith, the program code executable by a processor of a computer to perform a method, the method comprising:
generating a GUI comprising a representation of partitioned segments of video content, the representation depicting a dimension of time, a dimension of scale, and a dimension of relevance for the partitioned segments of video content,
wherein the dimension of scale refers to a level of granularity of the partitioned segments of video content;
determining the dimension of relevance for the partitioned segments of video content based on past user video content viewing and video content tagging; and
increasing or decreasing the dimension of scale on the generated GUI, based on the determined dimension of relevance for the partitioned segments of video content, together with semantic zooming of the partitioned segments of video content, within a navigation bar of the generated GUI, based on a text query of the user.

14. The computer program product of claim 13, wherein the GUI further comprises:
a first axis that depicts the dimension of time; and
a second axis that depicts the dimension of scale.

15. The computer program product of claim 13, further comprising:
determining the dimension of relevance for the partitioned segments of video content based solely on the text query.

16. The computer program product of claim 15, wherein determining the dimension of relevance further comprises:
receiving the text query from a user dynamically, or from a pre-defined source; and
comparing one or more attributes of the partitioned segments of video content to the text query, or to the pre-defined source; and
filtering the partitioned segments of video content that are lower than a pre-defined threshold value.

17. A computer system, comprising:
one or more computer devices each having one or more processors and one or more tangible storage devices; and
a program embodied on at least one of the one or more storage devices, the program having a plurality of program instructions for execution by the one or more processors, the program instructions comprising instructions for:
  generating a GUI comprising a representation of partitioned segments of video content, the representation depicting a dimension of time, a dimension of scale, and a dimension of relevance for the partitioned segments of video content,
    wherein the dimension of scale refers to a level of granularity of the partitioned segments of video content;
  determining the dimension of relevance for the partitioned segments of video content based on past user video content viewing and video content tagging; and
  increasing or decreasing the dimension of scale on the generated GUI, based on the determined dimension of relevance for the partitioned segments of video content, together with semantic zooming of the partitioned segments of video content, within a navigation bar of the generated GUI, based on a text query of the user.

18. The computer system of claim 17, wherein the GUI further comprises:
  a first axis that depicts the dimension of time; and
  a second axis that depicts the dimension of scale.

19. The computer system of claim 17, further comprising:
  determining the dimension of relevance for the partitioned segments of video content based solely on the text query.

* * * * *